US012503801B2

(12) United States Patent
Morrison et al.

(10) Patent No.: US 12,503,801 B2
(45) Date of Patent: Dec. 23, 2025

(54) LAUNDRY SYSTEMS

(71) Applicant: Hamilton Sundstrand Corporation, Charlotte, NC (US)

(72) Inventors: Terrell L. Morrison, League City, TX (US); Jorge Ramon Mesa, League City, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 263 days.

(21) Appl. No.: 18/097,049

(22) Filed: Jan. 13, 2023

(65) Prior Publication Data

US 2024/0240378 A1 Jul. 18, 2024

(51) Int. Cl.

| | |
|---|---|
| ***D06F 21/02*** | (2006.01) |
| ***D06F 21/00*** | (2006.01) |
| ***D06F 39/08*** | (2006.01) |
| *B64G 4/00* | (2006.01) |
| *D06F 13/06* | (2006.01) |
| *D06F 37/40* | (2006.01) |

(52) U.S. Cl.

CPC .............. *D06F 21/02* (2013.01); *D06F 21/00* (2013.01); *D06F 39/08* (2013.01); *B64G 4/00* (2013.01); *D06F 13/06* (2013.01); *D06F 37/40* (2013.01)

(58) Field of Classification Search

CPC .......... D06F 13/06; D06F 21/00; D06F 21/02; D06F 39/08; D06F 39/40

See application file for complete search history.

(56) References Cited

U.S. PATENT DOCUMENTS

| | | | | |
|---|---|---|---|---|
| 2,629,245 | A * | 2/1953 | Chamberlin ............ | D06F 37/22 68/23.1 |
| 4,018,067 | A | 4/1977 | Vona, Jr. et al. | |
| 7,191,484 | B2 * | 3/2007 | Dawe ...................... | D06F 33/48 68/23.1 |
| 8,448,477 | B2 | 5/2013 | Ashrafzadeh et al. | |

(Continued)

FOREIGN PATENT DOCUMENTS

| | | |
|---|---|---|
| CN | 102797133 A | 11/2012 |
| CN | 104164773 A | 11/2014 |

(Continued)

OTHER PUBLICATIONS

"Get a load of this: NASA to test laundry detergent made for space" Posted: Jun. 22, 2021, [retrieved on Feb. 15, 2025]. Retrieved from the internet:, URL https://www.cbc.ca/news/science/nasa-laundry-detergent-space-1.6075627.

(Continued)

*Primary Examiner* — Joseph L. Perrin

(74) *Attorney, Agent, or Firm* — CANTOR COLBURN LLP

(57) ABSTRACT

A laundry system can include a rotational motion chamber configured to be actuated rotationally and an agitation chamber configured to receive one or more washable articles. The agitation chamber can be disposed within the rotational motion chamber. The agitation chamber can be configured to be actuated linearly within the rotational motion chamber independent of the rotational motion chamber in a first state, and can be configured to be engaged to and rotated by the rotational motion chamber in a second state.

12 Claims, 1 Drawing Sheet

(56) References Cited

U.S. PATENT DOCUMENTS

| | | | | |
|---|---|---|---|---|
| 2002/0029594 A1* | 3/2002 | Monteiro | D06F 21/04 134/120 |
| 2004/0035155 A1* | 2/2004 | Yoon | D06F 23/02 68/145 |
| 2004/0163429 A1* | 8/2004 | Lim | D06F 37/40 68/140 |
| 2014/0366283 A1* | 12/2014 | Jun | D06F 37/04 8/137 |
| 2015/0176173 A1* | 6/2015 | Kim | D06F 39/088 68/140 |
| 2021/0131003 A1* | 5/2021 | Lee | D06F 37/40 |
| 2021/0131004 A1* | 5/2021 | Lee | D06F 37/40 |
| 2024/0117556 A1* | 4/2024 | Mesa | D06F 37/04 |
| 2024/0117558 A1* | 4/2024 | Mesa | B01D 5/006 |
| 2024/0175187 A1 | 5/2024 | Mesa et al. | |

FOREIGN PATENT DOCUMENTS

| | | |
|---|---|---|
| CN | 108221263 A | 6/2018 |
| CN | 108708147 A | 10/2018 |
| CN | 113274699 A | 8/2021 |
| DE | 806134 C | 6/1951 |

OTHER PUBLICATIONS

CEVIS specifications, [retrieved on Feb. 15, 2025]. Retrieved from the internet:, URL https://www.danishaerospace.com/en/products-sep/cevis/cevis-specifications.

Cevis, [retrieved on Feb. 15, 2025]. Retrieved from the internet:, URLhttps://www.danishaerospace.com/en/products-sep/cevis.

Cuthbertson, "How Almost-Waterless Washers Are Using Beads to Help Save the Environment" Newsweek Magazine, Feb. 9, 2017 [retrieved on Feb. 15, 2025]. Retrieved from the internet:, URLhttps://www.newsweek.com/2017/02/17/almost-waterless-washers-use-beads-help-save-environment-554511.html.

European Search Report for Application No. 24151637.6, mailed May 8, 2024, 6 pages.

International Exercise Countermeasures Hardware Catalog, International Countermeasures Working Group, Trieste, Italy, Jun. 2010, 41 pages.

Liberatore "NASA teams up with Tide to test how astronauts can wash their dirty laundry in space—with plans for celestial detergent, stain remover pens and even a moon based washer/dryer" [retrieved on Feb. 15, 2025]. Retrieved from the internet:, URL https://www.dailymail.co.uk/sciencetech/article-9714253/NASA-teams-Tide-test-astronauts-wash-dirty-laundry-space.html.

Shannon Palus, "There's No Laundry in Space, So NASA is Trying to Make Clothes That Don't Get Smelly" Jul. 14, 2014, [retrieved on Feb. 15, 2025]. Retrieved from the internet:, URL https://www.smithsonianmag.com/smart-news/there-no-laundry-space-nasa-works-reducing-astronaut-stench-2-180952031.

Vandewalle, et al. "Friction-loaded cycle ergometers: Past, present and future" rticle: 1029237 | Received Nov. 30, 2014, Accepted Mar. 9, 2015, Published online: Apr. 13, 2015, [retrieved on Feb. 15, 2025]. Retrieved from the internet:, URL https://www.tandfonline.com/doi/full/10.1080/23311916.2015.1029237.

Welch, "NASA Glenn Interns Take Space Washing Machine Designs for a Spin" Jul. 29, 2021, [retrieved on Feb. 15, 2025]. Retrieved from the internet:, URLhttps://www.nasa.gov/centers-and-facilities/glenn/nasa-glenn-interns-take-space-washing-machine-designs-for-a-spin/.

Yirka, "Diffusiophoresis found to be critical factor for getting clothes clean" Mar. 23, 2018, [retrieved on Feb. 15, 2025]. Retrieved from the internet:, URL https://phys.org/news/2018-03-diffusiophoresis-critical-factor.html.

Zyga, et al. "Nearly Waterless Washing Machine to Debut in 2009" Jul. 29, 2008, [retrieved on Feb. 15, 2025]. Retrieved from the internet:, URLhttps://phys.org/news/2008-07-waterless-machine-debut.html.

* cited by examiner

LAUNDRY SYSTEMS

FIELD

This disclosure relates to laundry systems, more specifically to laundry systems for use in space applications.

BACKGROUND

Extensive daily exercising and maintenance activities by crews in space results in hundreds of pounds of dirty laundry including clothing and other fabrics of which there is no capability to clean. Astronauts exercise for about two hours every day. About 2 to 4 lbs. (e.g., 20-40%) of the trash created every day on the International Space Station (ISS) is fabric based that can be rewashed and reused. It costs about $2000/lb to send something to the ISS, and it is about ten times that or more to send something to the Moon, Mars, and beyond. Also, on long range missions, the resupply time can be about 1 to 2 years. About 160 pounds of clothing per crew member per year are launched to the ISS currently.

Such conventional methods and systems have generally been considered satisfactory for their intended purpose. However, there is still a need in the art for improvements. The present disclosure provides a solution for this need.

SUMMARY

A laundry system can include a rotational motion chamber configured to be actuated rotationally and an agitation chamber configured to receive one or more washable articles. The agitation chamber can be disposed within the rotational motion chamber. The agitation chamber can be configured to be actuated linearly within the rotational motion chamber independent of the rotational motion chamber in a first state, and can be configured to be engaged to and rotated by the rotational motion chamber in a second state.

In certain embodiments, the laundry system can further include agitation chamber teeth associated with the agitation chamber and rotational chamber teeth associated with the rotational motion chamber. The agitation chamber teeth and the rotational chamber teeth can be configured to be disengaged in the first state. The agitation chamber teeth and the rotational chamber teeth can be configured to be engaged in the second state.

In certain embodiments, the laundry system can further include a flow assembly configured to provide access to an inner volume of the agitation chamber. The flow assembly can include a nozzle and a housing. The nozzle can extend from the inner volume of the agitation chamber beyond the outside of the rotational chamber. The housing can be configured to seal around the nozzle allowing the actuation chamber to axially and rotationally move while retaining the seal. The nozzle can remain sealed when the agitation chamber is actuating linearly in the first state and when the rotational motion chamber is actuating rotationally in the second state.

In certain embodiments, the laundry system can further include a bellows disposed between the agitation chamber and the rotational motion chamber. The bellows can provide a barrier to prevent debris from entering between the agitation chamber and the rotational motion chamber.

In certain embodiments, the agitation chamber teeth and the rotational chamber teeth can be arranged in one or more rings. The agitation chamber teeth can be disposed on an outer surface of the agitation chamber at an axial end, and the rotational chamber teeth can be disposed on an inner surface of the rotational motion chamber in a position to compliment the agitation chamber teeth.

In certain embodiments, the laundry system can further include a drive shaft connected to the agitation chamber to allow linear actuation of the agitation chamber within the rotational motion chamber. The laundry system can further include a linear motion handle. The linear motion handle can be rotatably mounted to the drive shaft. The linear motion handle can include a bearing. The bearing can be configured to allow the agitation chamber to rotate while the linear motion handle remains rotationally stationary.

In certain embodiments, the laundry system can further include a transmission assembly. The transmission assembly can include linear motion hardware and rotational motion hardware. The linear motion hardware can be configured to connect to the linear motion handle. The rotational motion hardware can be configured to connect to the rotational motion chamber. The transmission assembly can be configured to provide oscillating linear motion via the linear motion hardware to the agitation chamber in the first state and rotational motion to the rotational motion chamber via the rotational motion hardware in the second state. The transmission assembly can be configured to position the agitation chamber to the second state to engage the agitation chamber teeth with the rotational chamber teeth.

In certain embodiments, the rotational motion hardware can be a gearbox. The gearbox can be driven by a motor, for example.

In certain embodiments, the transmission assembly can be configured to hold the agitation chamber in the second state while rotationally actuating the rotational motion chamber. In certain embodiments, the rotational motion chamber is not fluidly connected to the agitation chamber.

A method can include linearly actuating an agitation chamber of a laundry system within a rotational motion chamber independent of the rotational motion chamber, engaging the agitation chamber to the rotational motion chamber, and rotationally actuating the agitation chamber with the rotational motion chamber while the rotational agitation is engaged. In certain embodiments, the method can further include operating a transmission assembly in a rotational drive mode after engaging the agitation chamber to the rotational motion chamber to rotationally actuate the rotational motion chamber. The method can further include disengaging the agitation chamber from the rotational motion chamber.

In certain embodiments, the method can further include operating the transmission assembly in a linear drive mode to linearly actuate the agitation chamber. The method can further include switching between the rotational drive mode and the linear drive mode at least once during a laundry cycle.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
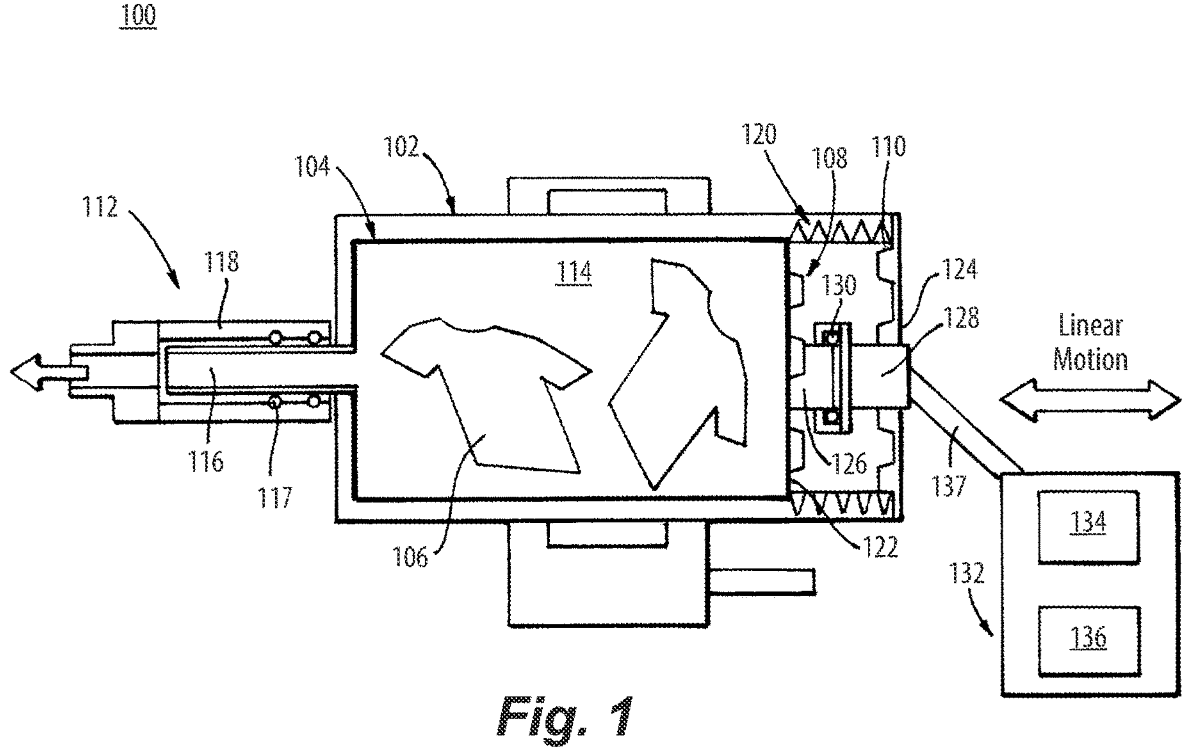
FIG. 1 is a schematic view of an embodiment of a laundry system, shown in a first state in accordance with this disclosure.
Figure 2:
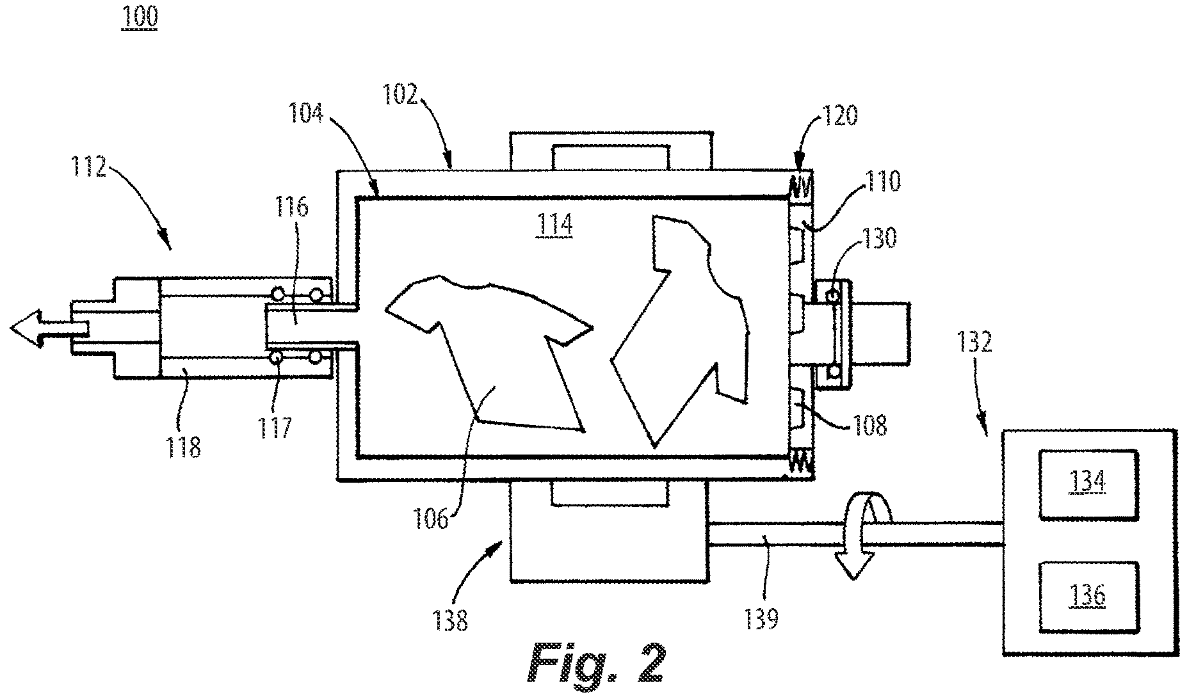
FIG. 2 is a schematic view of the embodiment of a laundry system of FIG. 1, shown in a second state in accordance with this disclosure.

Reference will now be made to the drawings wherein like reference numerals identify similar structural features or aspects of the subject disclosure. For purposes of explanation and illustration, and not limitation, an illustrative view of an embodiment of a laundry system in accordance with the disclosure is shown in FIGS. 1 and 2 and is designated generally by reference character 100. Certain embodiments described herein can be used to provide laundry capabilities to space missions (e.g., on spacecraft and/or planetary habitats), for example.

Referring to FIGS. 1 and 2, a laundry system 100 can include a rotational motion chamber 102 configured to be actuated rotationally and an agitation chamber 104 configured to receive one or more washable articles 106. The agitation chamber 104 can be disposed within the rotational motion chamber 102. The agitation chamber 104 can be configured to be actuated linearly within the rotational motion chamber 102 independent of the rotational motion chamber 102 in a first state (e.g., as shown in FIG. 1), and can be configured to be engaged to and rotated by the rotational motion chamber 102 in a second state (e.g., as shown in FIG. 2).

In certain embodiments, the laundry system 100 can further include agitation chamber teeth 108 associated with (e.g., disposed on and/or extending from) the agitation chamber 104 and rotational chamber teeth 110 associated with (e.g., disposed on and/or extending from) the rotational motion chamber 102. The agitation chamber teeth 108 and the rotational chamber teeth 110 can be configured to be disengaged in the first state (e.g., as shown in FIG. 1). The agitation chamber teeth 108 and the rotational chamber teeth 110 can be configured to be engaged in the second state (e.g., as shown in FIG. 2). In certain embodiments, the laundry system 100 can further include a spring. The spring can be configured to bias the agitation chamber 104 to the engaged position in the second state (e.g., as shown in FIG. 2). Any suitable mechanical connection can be used which results in engaging and disengaging the agitation chamber teeth 108 and the rotational chamber teeth 110 (e.g., the engagement/disengagement can be automatic or manually performed). In certain embodiments, the agitation chamber 104 can be locked into the second state, e.g., manually or automatically.

In certain embodiments, the laundry system 100 can further include a flow assembly 112 configured to provide access to an inner volume 114 of the agitation chamber 104. The flow assembly 112 can include a nozzle 116 and a housing 118. The nozzle 116 can extend from (e.g., and be in fluid communication with) the inner volume 114 of the agitation chamber 104 beyond the outside of the rotational chamber 102, e.g., as shown. The housing 118 can be configured to seal around the nozzle 116 (e.g., via one or more o-rings 117) allowing the actuation chamber 104 to axially and rotationally move while retaining the seal. The nozzle 116 can remain sealed when the agitation chamber 104 is actuating linearly in the first state (e.g., as shown in FIG. 1) and when the rotational motion chamber 102 is actuating rotationally in the second state (e.g., as shown in FIG. 2). The nozzle 116 can be configured to be an inlet or an outlet for fluid, e.g., washing fluid. The nozzle 116 can remain sealed during linear actuation and rotational actuation of the laundry system 100.

In certain embodiments, the laundry system can further include a bellows 120 disposed between the agitation chamber 104 and the rotational motion chamber 102. The bellows 120 can provide a barrier to prevent debris (e.g., a dust barrier) from entering between the agitation chamber 104 and the rotational motion chamber 102.

In certain embodiments, the agitation chamber teeth 108 and the rotational chamber teeth 110 can be arranged in one or more rings (e.g., in complimentary circular patterns that align and can mesh, e.g., as depicted). The agitation chamber teeth 108 and the rotational chamber teeth 110 can be arranged in any other suitable manner (e.g., to engage the agitation chamber 104 and rotational motion chamber 102). The agitation chamber teeth 108 can be disposed on an outer surface 122 of the agitation chamber 104 at an axial end, and the rotational chamber teeth 110 can be disposed on an inner surface 124 of the rotational motion chamber 102 in a position to compliment the agitation chamber teeth 108. The agitation chamber teeth 108 and the rotational chamber teeth 110 can be disposed in any suitable manner (e.g., any manner which allows for engagement of the agitation chamber 104 and the rotational motion chamber 102).

In certain embodiments, the laundry system 100 can further include a drive shaft 126 connected to the agitation chamber 104 to allow linear actuation of the agitation chamber 104 within the rotational motion chamber 102. The laundry system 100 can further include a linear motion handle 128. The linear motion handle 128 can be rotatably mounted to the drive shaft 126. The linear motion handle 128 can include a bearing 130. The bearing 130 can be configured to allow the agitation chamber 104 (and the drive shaft 126) to rotate while the linear motion handle 128 remains rotationally stationary (e.g., similar to how the fork on a bicycle is attached to the frame).

In certain embodiments, the laundry system 100 can further include a transmission assembly 132. The transmission assembly 132 can include linear motion hardware 134 and rotational motion hardware 136. The linear motion hardware 134 can be configured to connect to the linear motion handle 128 (e.g., via a linkage 137 that oscillates back and forth). The rotational motion hardware 136 can be configured to connect to the rotational motion chamber 102. The transmission assembly 132 can be configured to provide oscillating linear motion via the linear motion hardware 134 to the agitation chamber 104 in the first state (e.g., as shown in FIG. 1) and rotational motion to the rotational motion chamber 102 via the rotational motion hardware 136 (e.g., via a rotating shaft 139) in the second state (e.g., as shown in FIG. 2). The transmission assembly 132 can be configured to position the agitation chamber 104 to the second state to engage the agitation chamber teeth 108 with the rotational chamber teeth 110 (e.g., as shown in FIG. 2). The linear hardware 134 and the rotational hardware 136 can be driven by the same source and/or different sources. The transmission assembly 132 can have any suitable mechanical arrangement.

In certain embodiments, the rotational motion hardware 136 can be a gearbox 138. The gearbox 138 can be driven by the transmission assembly 132 (e.g., which can be connected to a motor). The gear box 138 can provide for a higher spin rate. The rotational motion hardware 136 can be any suitable source of rotational energy (e.g., a direct drive, a pulley/belt assembly).

In certain embodiments, the transmission assembly 132 can be configured to hold the agitation chamber 104 in the second state while rotationally actuating the rotational motion chamber 102 (e.g., as shown in FIG. 2). The agitation chamber 104 can be held in place in any suitable manner (e.g., a J-slot). In certain embodiments, the laundry system can include a sensor or window to show that agitation chamber teeth 108 and the rotational chamber teeth 110 are engaged. Any other suitable force can hold the agitation chamber 104 in the second state (e.g., frictional relationship). In certain embodiments, the rotational motion chamber 102 is not fluidly connected to the agitation chamber 104. Any other suitable arrangement is contemplated herein.

A method can include linearly actuating an agitation chamber 104 of a laundry system 100 within a rotational motion chamber 102 independent of the rotational motion chamber 102, engaging the agitation chamber 104 to the rotational motion chamber 102, and rotationally actuating the agitation chamber 104 with the rotational motion chamber 102 while the rotational agitation is engaged.

In certain embodiments, the method can further include operating a transmission assembly 132 in a rotational drive mode (e.g., as shown in FIG. 2) after engaging the agitation chamber 104 to the rotational motion chamber 102 to rotationally actuate the rotational motion chamber 102. The method can further include disengaging the agitation chamber 104 from the rotational motion chamber 102.

In certain embodiments, the method can further include operating the transmission assembly 132 in a linear drive mode (e.g., as shown in FIG. 1) to linearly actuate the agitation chamber 104. The method can further include switching between the rotational drive mode (e.g., as shown in FIG. 2) and the linear drive mode (e.g., as shown in FIG. 1) at least once during a laundry cycle. When switching between the rotational drive mode and the linear drive mode, each mode can be driven by the same source and/or different sources. Each drive mode can have multiple mechanical arrangements.

Certain embodiments can include an integrated system (e.g., a system capable of linear and rotational actuation) which can provide the ability to have more efficient laundering by providing a choice or combination of different methods of washing (e.g., linear and rotational) within a single system. This might be desired for tough stains or heavily soiled fabrics that individual systems might not clean as well. Embodiments can include the ability of separating gas-liquid as part of the washing chamber motion, and the capability of being able to switch easily from linear washing and/or drying to centrifugal/rotating washing and/or drying.

In accordance with at least one aspect of this disclosure, a laundry system for a spacecraft can be or include any suitable embodiment of a laundry system disclosed herein, e.g., as described above. A spacecraft can include an exercise machine, for example, and the laundry system can be connected to the exercise machine to be driven by the exercise machine.

Embodiments can be used in microgravity environments or in environments that have little-to-no power or water. Embodiments can be capable of use in gravity and microgravity, for example (e.g., environments with limited water and power supply).

Embodiments of a method for using an embodiment, e.g., as shown in FIG. 1-2, can include opening the door (e.g, 5 s), loading clothes into drum (e.g., 15 s), closing the door (e.g., 5 s), adding water and detergent (e.g., automated=5 s, manual=30-60 s), starting a wash cycle (e.g., 10-20 min), starting a dry cycle (e.g., vacuum, centrifugal, wrung, bag) (e.g., 0-10 min), and hanging clothes up to dry completely (e.g., with ECLSS). This method can facilitate the transition between linear and rotational actuation.

Embodiments can weigh less than 10 lbs., can be able to wash at least 1 medium size cotton t-shirt in less than 30 minutes, can have low volume (e.g., double EXPRESS rack locker dimensions (21.45×21.10×17.34 inches)), can use minimum power (e.g., less than 500 W or as minimal as possible), can use minimum water (e.g., less than 1 L per run or as minimal as possible), and can use minimum detergent (e.g., less than 50 ml). Embodiments can enable water recovery of greater than 90%. Embodiments can provide the ability to produce about 80% clean cotton t-shirt or higher cleanliness (e.g., of any fabric).

Automated embodiments can include any suitable computer hardware and/or software. Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A laundry system, comprising:

a rotational motion chamber configured to be actuated rotationally;

an agitation chamber configured to receive one or more washable articles and disposed within the rotational motion chamber, the agitation chamber configured to be actuated linearly within the rotational motion chamber independent of the rotational motion chamber in a first state, and to be engaged to and rotated by the rotational motion chamber in a second state;

agitation chamber teeth associated with the agitation chamber; and rotational chamber teeth associated with the rotational motion chamber, wherein the agitation chamber teeth and the rotational chamber teeth are configured to be disengaged in the first state, wherein the agitation chamber teeth and the rotational chamber teeth are configured to be engaged in the second state.

2. The laundry system of claim 1, further comprising a flow assembly configured to provide access to an inner volume of the agitation chamber, wherein the flow assembly includes:

a nozzle, wherein the nozzle extends from the inner volume of the agitation chamber beyond the outside of the rotational chamber; and a housing configured to seal around the nozzle allowing the actuation chamber to axially and rotationally move while retaining the seal, wherein the nozzle remains sealed when the agitation chamber is actuating linearly in the first state and when the rotational motion chamber is actuating rotationally in the second state.

3. The laundry system of claim 1, further including a bellows disposed between the agitation chamber and the rotational motion chamber to provide a barrier to prevent debris from entering between the agitation chamber and the rotational motion chamber.

4. The laundry system of claim 1, wherein the agitation chamber teeth and the rotational chamber teeth are arranged in one or more rings.

5. The laundry system of claim 1, wherein the agitation chamber teeth are disposed on an outer surface of the agitation chamber at an axial end, and the rotational chamber teeth are disposed on an inner surface of the rotational motion chamber in a position to compliment the agitation chamber teeth.

6. The laundry system of claim 5, further comprising a drive shaft connected to the agitation chamber to allow linear actuation of the agitation chamber within the rotational motion chamber.

7. The laundry system of claim 6, further comprising a linear motion handle, wherein the linear motion handle is rotatably mounted to the drive shaft, wherein the linear motion handle includes a bearing, wherein the bearing is configured to allow the agitation chamber to rotate while the linear motion handle remains rotationally stationary.

8. The laundry system of claim 7, further comprising a transmission assembly comprising linear motion hardware configured to connect to the linear motion handle, wherein the transmission assembly includes rotational motion hardware configured to connect to the rotational motion chamber, wherein the transmission assembly is configured to provide oscillating linear motion via the linear motion hardware to the agitation chamber in the first state and rotational motion to the rotational motion chamber via the rotational motion hardware in the second state.

9. The laundry system of claim 8, wherein the transmission assembly is configured to position the agitation chamber to the second state to engage the agitation chamber teeth with the rotational chamber teeth.

10. The laundry system of claim 8, wherein the rotational motion hardware is a gearbox, wherein the gearbox is driven by a motor.

11. The laundry system of claim 9, wherein the transmission assembly is configured to hold the agitation chamber in the second state while rotationally actuating the rotational motion chamber.

12. The laundry system of claim 1, wherein the rotational motion chamber is not fluidly connected to the agitation chamber.

* * * * *